March 28, 1961 R. S. ZEBARTH 2,976,983
POULTRY CONVEYOR

Filed Oct. 29, 1956 2 Sheets-Sheet 1

INVENTOR.
Ralph S. Zebarth
BY
ATTORNEY.

INVENTOR.
Ralph S. Zebarth

United States Patent Office 2,976,983
Patented Mar. 28, 1961

2,976,983
POULTRY CONVEYOR

Ralph S. Zebarth, Hickman Mills, Mo., assignor, by mesne assignments, to Gordon Johnson Company, Kansas City, Mo., a corporation of Missouri Filed Oct. 29, 1956, Ser. No. 619,056

1 Claim. (Cl. 198—177)

This invention relates to a novel poultry conveyor and more particularly to structure for continuously advancing a series of birds through a poultry processing plant with the birds suspended through use of shackles adapted to receive the legs or the necks of the birds.

It is the most important object of the present invention to provide apparatus that combines an overhead conveyor with a poultry-supporting assembly therebeneath, the latter of which includes the aforementioned shackles but which are interconnected through use of a continuous, flexible element to the end that when the assembly is suspended from the conveyor, the birds are advanced in continuous succession during movement of the conveyor and as the said flexible element imparts a pulling action on the shackles which it interconnects.

Another important object of the instant invention is to provide apparatus in the nature of that just above set forth and including as a part thereof a plurality of members, preferably rigid and in the nature of elongated bars for suspending the interconnected shackle assembly from the conveyor and limiting the extent of swinging movement of individual birds to thereby eliminate entanglement when flights thereof are advanced in opposite directions and in close proximity.

A further object of the instant invention is to provide a poultry conveyor that includes a plurality of carriages supported by an overhead track and each in turn being provided with a shackle suspended therefrom through the medium of an elongated bar swingably attached to the carriage and swingably receiving the shackle whereby to accomplish the aforementioned new and advantageous results when the shackles are joined by a chain or the like.

A still further object of the instant invention is to provide a poultry conveyor having the carriages thereof provided with stems that are in turn joined by a chain so that both chains cooperate in advancing the birds in predetermined order as the carriages are actuated.

Figures 3, 4:
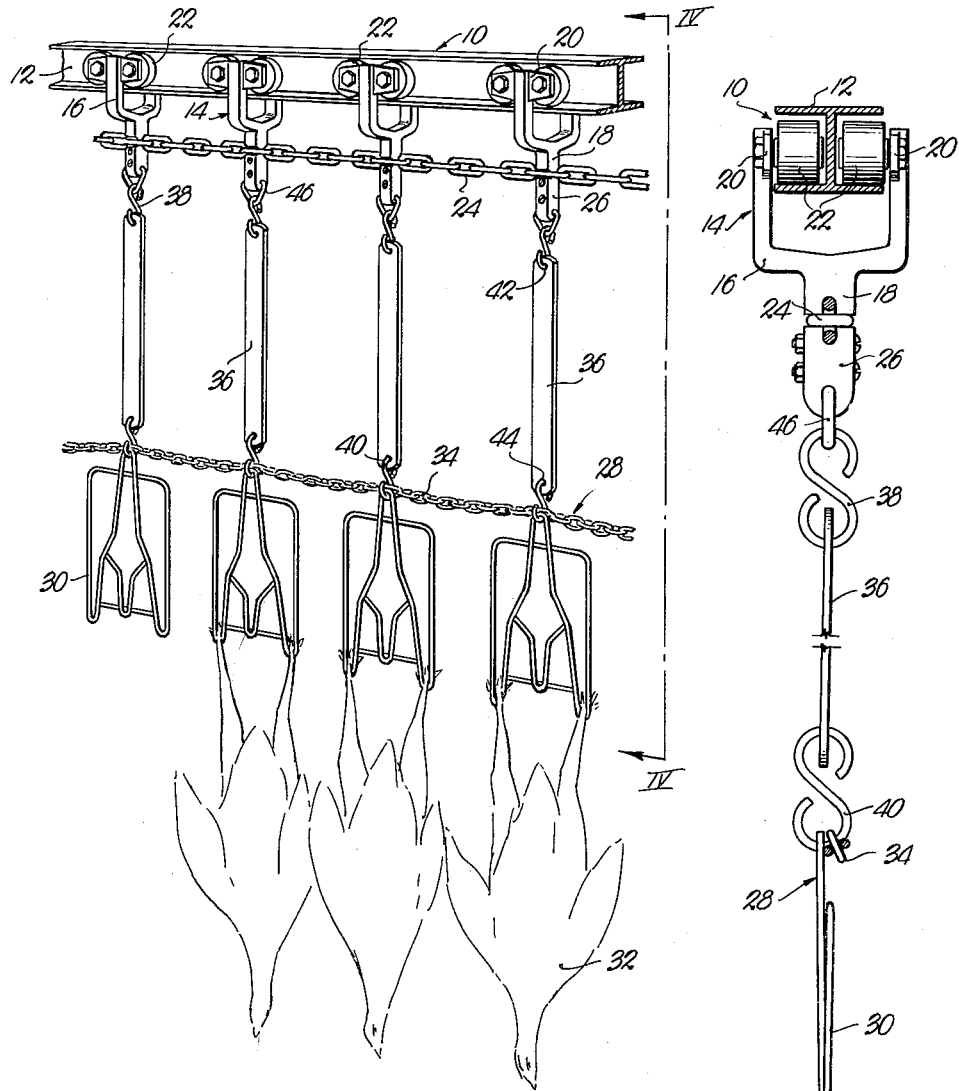
Fig. 3 is a fragmentary, perspective view still further enlarged and illustrating the poultry conveyor shown by Figs. 1 and 2.
Fig. 4 is a cross-sectional view taken on line IV—IV of Fig. 3 still further enlarged.

The important details of construction of the poultry apparatus forming the subject matter of the instant invention are best illustrated in Figs. 3 and 4 of the drawings and includes an overhead conveyor broadly designated by the numeral 10. An overhead track 12 forming a part thereof may be in the nature of an I-beam adapted to support a plurality of spaced carriages 14, each of which includes a yoke 16 embracing the track 12 and having a stem 18 depending therefrom. Opposed horizontal plates 20 rigid to the uppermost ends of the yokes 16 each mount a pair of rollers 22.

The stems 18 are preferably interconnected by a continuous, flexible device in the nature of a chain 24. Stems 18 are each provided with a portion of reduced diameter adapted to receive a link of the chain 24, the latter of which is held in place by a block 26 releasably connected with the stem 18. The manner of advancing the carriages 14 along the track 12 forms no part of the instant invention and it is suffice to point out that I contemplate utilizing an actuating unit (not shown) that successively engages the yokes 16 themselves, the chain 24 cooperating therewith in imparting a pulling action to the stems 18 as the carriages 14 are thus advanced.

The apparatus of the instant invention includes in addition to the overhead conveyor 10 a poultry-supporting assembly beneath the conveyor 10 and broadly designated by the numeral 28. It includes a series of shackles 30 each adapted to support a bird 32 by its legs as illustrated in Fig. 3 or by its neck if desired. The assembly 28 includes additionally, means in the nature of an elongated, flexible element 34 for interconnecting the shackles 30. The element 34, like the device 24, is preferably in the nature of a chain and the entire assembly 28 is in turn supported by the conveyor 10.

The last mentioned support means preferably takes the form of a plurality of rigid members 36 such as elongated bars that are not only swingably connected to the conveyor, but swingably receive the assembly 28. Substantially S-shaped hooks 38 and 40 are provided at each end respectively of each bar 36. The hooks 38 and 40 are swingable with respect to the bars 36 by virtue of the fact that they pass through openings 42 and 44 respectively at the uppermost and lowermost ends of the bars 36.

A triangular-shaped eye 46 is swingably mounted on each block 26 respectively and since each eye 46 in turn receives a hook 38, the latter is swingable with respect to the eyes 46.

It is to be noted that each shackle 30 is swingably received by a corresponding hook 40 and that such means 40 for coupling the shackles 30 with the bars 36, are adapted to receive a link of the chain 34 as best seen in Fig. 4 to thereby interconnect the lowermost ends of the bars 36.

Figure 1:
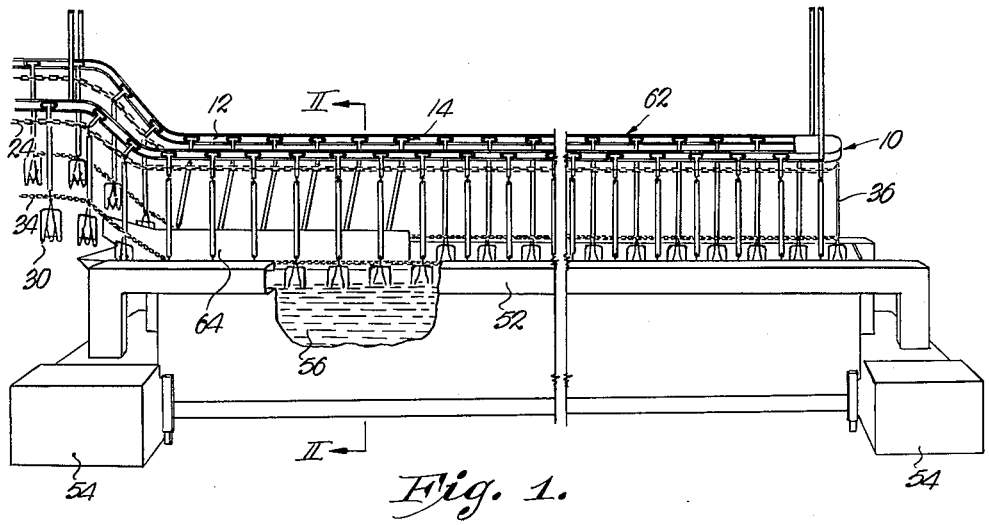
Figure 1 is a perspective view showing one side of a poultry scalder, together with a poultry conveyor made pursuant to the instant invention showing the way in which it is associated with the scalder.
Figure 2:
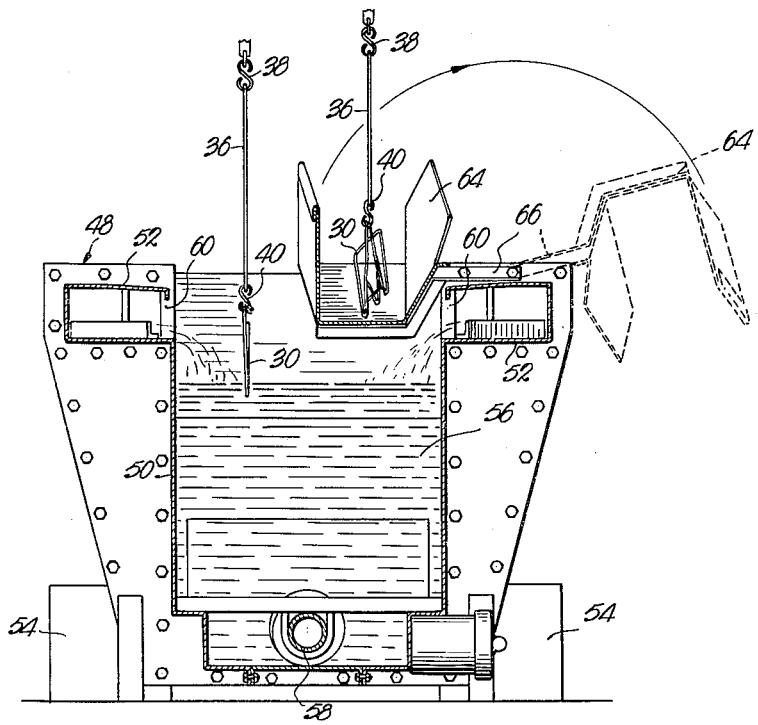
Fig. 2 is an enlarged, cross-sectional view taken on line II—II of Figure 1.

Some of the advantages of the poultry conveyor just above described can best be understood by referring to Figs. 1 and 2 of the drawings and particularly, to a novel scalder broadly designated by the numeral 48 and with which the apparatus shown in Figs. 3 and 4 is especially adapted to be used.

Scalder 48 takes the form of an elongated, open-top tank 50 having a pair of opposed, elongated tubes 52 extending longitudinally thereof adjacent its uppermost edges. Pumping means broadly designated by the numeral 54 at one or at both ends of the tank 50, continuously circulate scalding water 56 from a manifold 58 at the bottom of the tank 50, into the tubes 52 and thence back into the tank 50 by way of longitudinally extending outlet slots 60 formed in the tubes 52.

A constant level of the scalding water 56 is maintained in the tank 50 as seen in Figs. 1 and 2, and it is through such water 56 that the birds 32 are advanced when the track 12 is formed in a continuous loop 62 above the scalder 48 as seen in Figure 1. It is accordingly clear that birds 32 enter at one end of the tank 50, are advanced through the liquid 56 in one direction to the opposite end of the tank 50, whereupon the birds 32 make a U-turn and are advanced in the opposite direction through the water 56 before moving out of the tank 50.

Figure 2 of the drawings illustrates the close proximity of the two flights of birds 32 being advanced in opposite directions through the scalder 48. It is to be pointed out that the water emanating from the slots 60 pours into the tank 50 with great velocity and in substantial volume, pulling the birds 32 downwardly therewith into the water 56 and maintaining the same submerged at all times. The great force and volume of the scalding liquid emanating from the slots 60 tends to move all of the birds 32 toward the center of the tank 50 and except for the novel characteristics of the apparatus shown in Figs. 3 and 4, the oppositely traveling birds will become entangled even to the extent of requiring shut-down or extensive damage to the entire conveyor apparatus.

By virtue of the provision of chain 34 and bars 36 however, such entanglement is prevented since each individual bird 32 is permitted to swing inwardly only to a limited extent toward the longitudinal center of the tank 50. While the chain 34 and the bars 36 eliminate the entanglement problem, the construction shown in Figs. 3 and 4, when made as above specified, does not however, deleteriously effect a substantial amount of swinging movement of the assembly 38 as a unit. More particularly, it is to be noted that the bars 36 are permitted to swing individually to a limited extent and the shackles 30 themselves are not appreciably restrained against swinging movement.

The chain 34, as well as the bars 36, have the additional advantage of cooperating with the chain 24 and its associated parts in pulling the birds 32 through the water 56 and along the entire processing line through various and other sundry equipment used in de-feathering, scalding, eviscerating and other operations commonly employed in processing plants.

The relatively long hot scald for the birds 32 that is made possible through the construction of scalder 48, has many advantages and there is additionally provided means to permit use of the same scalder for virtually every type of poultry. In the event it is used for example, in scalding turkeys, the relatively long period of time during which such birds are within the liquid 56, is to be desired. On the other hand, if the scalder 48 is to be used for smaller birds such as chickens, it is necessary to decrease the period of immersion. To this end there is provided an elongated, open-top trough 64 that may be disposed within the path of travel of the birds 32 as they approach the tank 50.

The trough 64 is swingably connected to the scalder 48 through the medium of hinge means 66 to the end that it may be swung to the dotted line position shown in Fig. 2 when not in use. The length of the trough 64 is to be selected, depending upon the length of time during which the birds 32 should be held out of the liquid 56 and before the birds 32 are permitted to drop into the streams of inwardly flowing water intermediate the ends of the tank 50.

It is to be noted that the apparatus shown in Figs. 3 and 4 is especially suited for permitting use of the trough 64 in the manner just above described, since the birds 32 will all be held in substantial alignment by the chain 34 as the birds 32 approach the trough 64. Although the bars 36 are of themselves rigid, the flexible interconnection between the shackles 30 and the conveyor 10, through the bars 36, permits the birds 32 to slide along the trough 64 and thereupon drop into the water 56 at the innermost end of trough 64.

Having thus described the invention what is claimed as new and desired to be secured by Letters Patent is:

In combination with an overhead poultry conveyor having a track, a plurality of spaced carriages supported by the track for movement therealong and each provided with a rigid, downwardly extending stem, and a first continuous chain having a series of links, each stem extending through a link in the first chain and thereby attached to the latter to maintain said stems in upright, generally parallel relationship, a poultry supporting assembly comprising an eye attached to each stem respectively at the lowermost end of the latter below said first chain; an elongated, vertical bar for each of said stems respectively, said bars being of substantially equal length; a plurality of first hooks, each of said first hooks swingably securing the upper end of a respective bar to the eye of a corresponding stem whereby the bars are suspended from said stems; a poultry receiving shackle beneath each bar respectively; a series of second hooks, each of said second hooks swingably suspending a respective shackle from a corresponding bar; and a second continuous chain having a series of links and disposed in vertically spaced, generally parallel relationship to said first chain, said second hooks extending through links of the second chain to maintain said bars in substantially equidistant relationship and thereby restricting relative movement in a direction longitudinally of the track while permitting relatively free movement thereof in directions transverse to the longitudinal length of said track.

References Cited in the file of this patent

UNITED STATES PATENTS

| | | |
|---|---|---|
| 851,701 | Spear | Apr. 30, 1907 |
| 1,720,690 | Preble | July 16, 1929 |
| 2,607,073 | Johnson | Aug. 19, 1952 |
| 2,830,694 | Zebarth | Apr. 15, 1958 |

FOREIGN PATENTS

| | | |
|---|---|---|
| 115 | Great Britain | Jan. 2, 1904 |
| 832,575 | Germany | Feb. 25, 1952 |
| 1,109,385 | France | Sept. 21, 1955 |